O. RICHTER & H. VOGEL.
TWO-STROKE CYCLE INTERNAL COMBUSTION ENGINE.
APPLICATION FILED APR. 21, 1915.
1,176,096.
Patented Mar. 21, 1916.
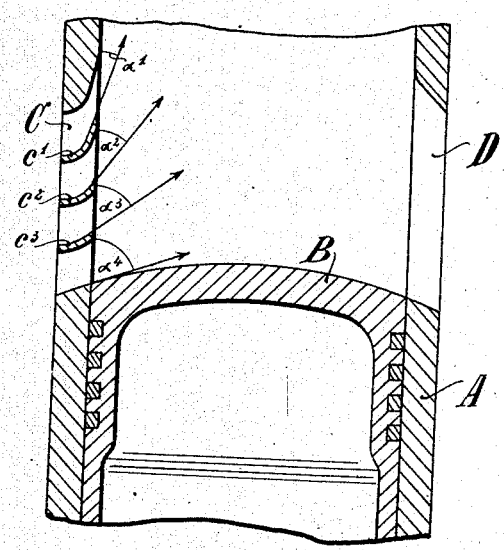

UNITED STATES PATENT OFFICE.

OSKAR RICHTER AND HANS VOGEL, OF KIEL, GERMANY.

TWO-STROKE-CYCLE INTERNAL-COMBUSTION ENGINE.

1,176,096.  Specification of Letters Patent.  Patented Mar. 21, 1916.

Application filed April 21, 1915. Serial No. 22,908.

*To all whom it may concern:*

Be it known that we, OSKAR RICHTER and HANS VOGEL, citizens of the German Empire, residing at Kiel, Germany, have invented certain new and useful Improvements in Two-Stroke-Cycle Internal-Combustion Engines, of which the following is a specification.

The present invention relates to an improvement in two-stroke-cycle internal combustion engines having piston-controlled scavenging ports for guiding the injected scavenging air, which are provided with solid cast or inserted guide blades.

One embodiment of the present invention is illustrated in the drawing, the figure showing a vertical longitudinal section of the middle portion of an upright working cylinder.

A is the working cylinder and B the piston of a two-stroke cycle internal combustion engine, one of the scavenging ports, of which is denoted by C and one of the exhaust ports by D. For the sake of simplicity, only one of the scavenging ports and one of the exhaust ports has been shown. Guide blades $c^1$ $c^2$ $c^3$, for guiding the scavenging-air entering from the annular scavenging-air passage, not shown, are, in known manner, built into the scavenging port C. The angles of departure $a^1$ $a^2$ $a^3$ $a^4$ of these guide blades and the adjoining walls of the port C, have now, in accordance with the present invention, been so selected, that they increase from the top downward, in such a manner that the top guide plate $c^1$ deflects the scavenging air almost parallel to the cylinder wall, while the lower down situated guide blades are so directed that the departing air current, the expansion of which increases in the cylinder on account of spraying, distributes itself in the remaining space of the working cylinder, the lowermost orifice being positioned to direct scavenging air across the top of the piston. In this manner, a complete scavenging of the entire cylinder contents is assured, and formation of dead spaces prevented, which could not be reached by the scavenging air, and wherein the combustion gases whirl uselessly as would, for instance, occur in motors, where the angles of departure of all the guide blades are of the same magnitude.

In order to attain with certainty the desired action, the piston body is preferably made slightly convex on top, but without any hitherto usual guiding projection. It is, of course, to be understood that the engine may be provided with any desired number of scavenging ports equipped with deflecting blades in the manner described.

We claim:—

1. In a working cylinder for a two-stroke-cycle internal combustion engine having a piston controlled scavenging port, guide blades in said port, said blades being so constructed that each blade guides the entering scavenging air at a different angle as regards the side of the cylinder, said angles increasing from the cap end to the crank end of the cylinder.

2. In a working cylinder for a two-stroke-cycle internal combustion engine having a piston controlled scavenging port, guide blades in said port, the piston head being slightly convex on its pressure side; said guide blades forming a plurality of intake orifices in said port, each of said orifices directing the scavenging air passing therethrough at a different angle, said angles gradually decreasing from the piston when retracted, toward the cap end of the cylinder, the lowermost orifice directing scavenging air across said convex side of the piston and the uppermost orifice directing scavenging air upwardly and approximately parallel to the side of the cylinder.

In testimony whereof the foregoing specification is signed in the presence of two witnesses.

OSKAR RICHTER.
HANS VOGEL.

Witnesses:
 JULIUS ROJIKE,
 HUGO LIEBELT.